United States Patent Office 3,229,721
Patented Jan. 18, 1966

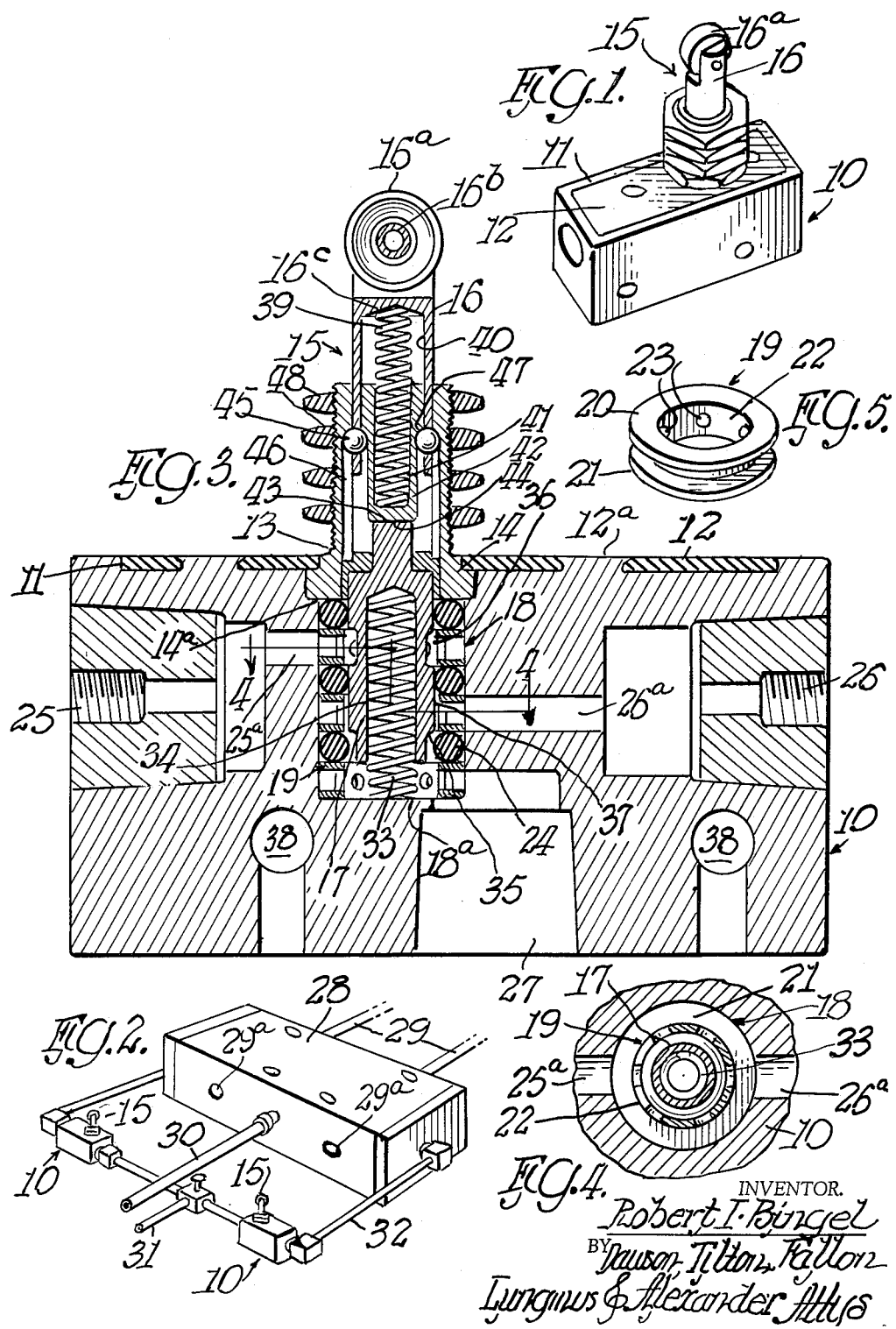

3,229,721
PNEUMATIC VALVE CONSTRUCTION
Robert I. Bingel, Arlington Heights, Ill., assignor to Mead Specialties Company, Inc., Chicago, Ill., a corporation of Illinois
Filed Aug. 15, 1963, Ser. No. 302,336
1 Claim. (Cl. 137—625.69)

This invention relates to a novel valve construction, and, more particularly, to a valve of the pneumatic type which eliminates the need for electrical switches in fluid-control applications.

Historically, electrical limit switches have been employed to control pneumatic applications such as air cylinders. These electrical limit switches are small and compact but require the use of a solenoid coil and wiring, resulting in additional costs and fire hazards. It is an object of this invention to avoid these disadvantages through the provision and use of a novel pneumatic element.

The invention is described in conjunction with an illustrative embodiment in the accompanying drawing, in which:

FIG. 1 is a perspective view of the inventive valve;

FIG. 2 is a perspective, schematic view of the inventive valve shown in a typical environment;

FIG. 3 is a longitudinal section, in fragmentary form, through the valve, four times full size;

FIG. 4 is a stepped horizontal section taken along the sight line 4—4 of FIG. 3 and shown in fragmentary form; and FIG. 5 is a perspective view of one of the spacer elements employed in the valve and seen best in FIG. 3.

In the illustration given and with particular reference to FIG. 3, the inventive valve is seen to include a body generally designated 10, which is equipped with a top recess designated 11 (see FIG. 1) in which an anchoring plate 12 is fixed as by deformation at 12a. The plate 12 thus anchors a stepped sleeve 13 as a rigid portion of the body, and with plunger plug 14 confines the plunger generally designated 15 against removal. The plunger 15 includes an upper portion 16 and a lower portion 17. The upper end 16 is equipped with a roller actuator 16a suitably pivotably mounted as at 16b. It will be appreciated that a variety of other actuating arms, levers, etc., may be employed for the top portion 16 of the plunger 15.

For the purpose of accommodating the travel of the plunger 15, the body 10 is equipped with a transverse bore 18 (see FIG. 3) in which are provided three spacers 19, one of which is seen in FIG. 6. The spacer 19 is equipped with end flanges as at 20 and 21 integral with a tubular central portion 22 defining essentially a U shape in radial section, as can be appreciated from a consideration of FIG. 3. Each spacer 19 is equipped with circumferentially spaced apart openings 23 in the tubular wall 22. Interspersed between the spacers are O-rings 24 (seen only in FIG. 3) and the assembly of the three O-rings and three spacers is maintained by the plunger plug 14 providing a top wall as at 14a and the bore 18 providing a bottom wall as at 18a.

Communicating with the transverse bore 18 are a pair of longitudinal bores 25 and 26. Also provided in the body 10 is a second transverse bore 27. The bores 25–27 provide different fluid paths, as can be appreciated from the following.

As an example of the operation of the inventive valve, the valve bodies 10 are shown in FIG. 2 to be coupled to a master valve 28. The master valve 28 in turn is equipped with a pair of conduits 29 leading to an air cylinder (not shown). A source of compressed air (also not shown) is coupled by means of a conduit 30 to the master valve and by means of a conduit 31 to the two limit valves embodying the bodies 10. By depressing one of the roller actuators 16a, the interior spool (not shown) of the master valve 28 can be shifted from one side to the other, thereby communicating the compressed air entering through the pipe 30 to one or the other of the conduits 29. The conduit 29 not so connected is coupled to the atmosphere by way of one of the exhaust ports 29a. A typical connection for the limit valve 10 includes the source of compressed air coupled to the longitudinal bore 25, while the master valve is coupled by means of conduit 32 to the other longitudinal bore 26.

In the configuration shown in FIG. 3, the plunger lower portion 17 is maintained in its uppermost position by means of a coiled spring 33 bearing against the bottom wall 18 and received within an axially-extending bore 34 within the plunger lower portion 17. Thus, the longitudinal bore 26 is coupled by means of the lower and central spacers with the second transverse bore 27 to vent compressed air from the side of master valve 28 previously pressurized. Cooperating with the spacers 19 for this purpose is the plunger, which is equipped with annular shoulders as at 35 and 36.

Upon depression of the plunger 15, the shoulder 35 engages the lowermost O-ring 24 and seals the bores or ports 26 and 27 against communication, but by virtue of the space 37 between the shoulders 35 and 36, communicates the two uppermost spacers and hence the bores 25 and 26, permitting air to flow through the limit valve 10 to the master valve for a repositioning of its spool or other operator.

The air system such as seen in FIG. 2 can be referred to as being "fail-safe." Where an electrical switch will fail suddenly, causing an inconvenient work stoppage, an air component will wear so gradually that work can safely continue for many hours after a problem develops. This permits repair work to be done during an idle period without loss of valuable machine time. Also, should there be a general power failure, the compressor will have enough surplus air to complete at least one operation and return the device to a safe starting position.

The inventive valve is constructed to be dimensionally similar to existing electrical limit switches so that the valve can be bodily incorporated into an existing switching arrangement without change in the detail of the means previously employed for actuating the electrical limit switch, i.e., cam, reciprocating element, etc. Through the use of a miniaturized valve, the conduits 32 can be made of small ⅛" diameter tubing which flexes and generally approximates wire employed in electrical switches. A further advantage accrues in that the conduits coupling the limit valves 10 into the rest of the system need not be housed in the bulky protective covering required for electrical lines. No special housings or seals are required.

By vertically spacing (as shown) the inner end portions of the bores 25 and 26 as at 25a and 26a, respectively, and by communicating the exhaust port 27 as shown, there is provided a two-condition operation whereby the plunger 15 selectively communicates different ports or bores.

In the condition shown in FIG. 3, the shoulder 35 engages the middle O-ring 24 so as to isolate the inlet bore 25 from the compressed air bore 26. When the plunger 15 is depressed, the shoulder 35 engages the lowermost O-ring 24 and isolates the bores 26 and 27 while maintaining the bores 25 and 26 in communication by virtue of fluid passing through the space 27. Thus, the two lower O-rings 24 act as flow passage seals, while the uppermost O-ring 24 merely serves to prevent the pressure fluid from escaping out of the body 10. The O-rings 24 have an inner diameter smaller than the inner diameter of the spacers 19 to provide for the selective fluid flow just described.

A specific example of the inventive valve has a body 10 measuring 5/8 x 7/8 x 1¾. The body is equipped with mounting bores 38 to enable the limit valve to be conveniently mounted as desired. Using the roller plunger as shown, the operating stroke is of the order of 1/16". It will be appreciated that greater operating strokes can be achieved through the use of levers such as roller levers, fingertip levers, etc.

In the illustration given, the plunger 15 has an operating stroke of 1/16" and a 1/8" overtravel provided by the two-piece plunger construction as seen in FIG. 5. In FIG. 3, it is seen that the plunger plug 14 confines the upper plunger portion 17 against upward movement, while the stepped sleeve 13 confines the upper plunger portion 16 against upward movement. The overtravel feature is provided by a spring 39 mounted within an axially-extending bore 40 provided in the upper plunger portion 16. The spring 39 is interposed between the upper wall 16c and an axial bore 41 provided in the plunger stem 42. Thus, upon initial depression of the plunger 15 as by engagement with the roller 16a, the lower spring 33 is preferentially compressed to change the position of the lower plunger portion 17. When the lower plunger portion 17 has moved its maximum travel of 1/16", further downward pressure on the roller 16a causes compression of the upper spring 39. It will be seen that the plunger stem 42 is equipped with a bottom abutment surface 43 which engages the top abutment surface 44 of the lower plunger portion 17.

Upon release of downward pressure on the roller 16a, both the springs 33 and 39 urge their respective plunger portions 17 and 16 upwardly. For the purpose of simultaneously moving the plunger stem 42 upwardly, the upper plunger portion 16 is equipped with a pair of balls 45 mounted in suitable apertures and which are guided by the slots 46 provided in the inside wall of the stepped sleeve 13. The balls 45 are confined against radially inward movement by an annular shoulder 47 provided on the plunger stem 42.

It will be seen that the stepped sleeve 13 is equipped with external threads and a plurality of jamb nuts 48 mounted thereon for convenience in panel mounting of the valve. The valve body 10 may be conveniently mounted through the above-mentioned mounting bores 38 and inasmuch as the limit is achieved pneumatically, the body 10 may be constructed of plastic or other nonmetallic material—in contrast to the requirement for most electrical industrial limit switches.

While in the foregoing specification a detailed description of an embodiment of the invention has been set down for the purpose of explanation, many variations in the details herein given may be made by those skilled in the art without departing from the spirit and scope of the invention.

I claim:

A pneumatic valve for replacing an electrically operated miniature switch comprising a generally rectangular body having elongated top, bottom, and side faces and smaller end faces, a first bore extending part way into said body from the central portion of said top face, a plunger reciprocally mounted in said bore, resilient means in said first bore urging said plunger out of said body, means on said body confining said plunger against outward movement under the influence of said resilient means, a second bore extending part way into said body from the central portion of one of said end faces and communicating with said first bore, a third bore extending part way into said body from the central portion of the other of said end faces and communicating with said first bore, said second bore communicating with said first bore at a point above the communication of said third bore with said first bore, said second and third bores being equipped with thread means whereby said second bore is adapted to be coupled to a source of pressure fluid and said third bore to a member actuatable by pressure fluid, a fourth bore extending part way into said body from the central portion of said bottom face and being generally parallel to, but offset from said first bore, said first and fourth bores communicating at the inner ends thereof and through the sidewalls thereof, below the communication of said first and third bores, said fourth bore being open to the atmosphere to serve as an exhaust port, a plurality of ring seals mounted in said first bore in spaced-apart relation with apertured spacer means between adjacent ring seals and having the said apertures aligned with each of said second, third and fourth bores, said plunger being equipped with an annular shoulder for cooperating with said ring seals and spacer means to selectively isolate and communicate said second, third and fourth bores whereby depression of said plunger causes said shoulder to move from a first position isolating said second bore from said third bore, but communicating said third and fourth bores to a second position isolating said fourth bore from said third bore whereby communication is established between said second and third bores for delivering pressure fluid to actuate said member, release of said plunger again communicating said third and fourth bores to exhaust pressure fluid from said member through said fourth bore while said second bore is isolated from said third bore.

References Cited by the Examiner
UNITED STATES PATENTS

| 2,369,505 | 2/1945 | Ward | 137—625.6 |
| 2,661,182 | 12/1953 | Kipp | 137—625.69 XR |
| 2,916,252 | 12/1959 | Hobbs et al. | 137—625.25 |
| 2,938,704 | 5/1960 | Quail | 137—625.25 |

MARTIN P. SCHWADRON, *Acting Primary Examiner.*

M. CARY NELSON, *Examiner.*